United States Patent [19]

Boggs

[11] 4,380,761

[45] Apr. 19, 1983

[54] DIGITAL PHASE DECODER WITH COLLISION DETECTION

[75] Inventor: David R. Boggs, Palo Alto, Calif.

[73] Assignee: Xerox Corporation, Stamford, Conn.

[21] Appl. No.: 118,262

[22] Filed: Feb. 4, 1980

[51] Int. Cl.³ .............................................. H04Q 9/00
[52] U.S. Cl. .............................. 340/825.5; 340/825.2; 340/825.7; 370/85
[58] Field of Search .................. 340/147 LP, 147 SY, 340/170, 825.2, 825.5, 825.7; 329/50, 112; 375/84, 85, 87, 56; 360/42, 44; 178/66.1; 370/85, 94; 371/57; 455/58

[56] References Cited

U.S. PATENT DOCUMENTS

| | | |
|---|---|---|
| 3,278,758 | 10/1966 | Vroman . |
| 3,335,224 | 8/1967 | Meslener et al. . |
| 3,350,687 | 10/1967 | Gabrielson et al. ................. 340/163 |
| 3,496,293 | 2/1970 | Avery et al. ........................ 178/58 |
| 3,509,538 | 4/1970 | Holden et al. ...................... 340/163 |
| 3,725,870 | 4/1973 | Felchek .............................. 340/152 |
| 3,745,462 | 7/1973 | Trimble . |
| 3,819,932 | 6/1974 | Auer et al. .......................... 340/163 |
| 3,825,897 | 7/1974 | Lawton ........................ 340/147 LP |
| 3,942,116 | 3/1976 | Ferguson ........................ 179/170.6 |
| 3,967,059 | 6/1976 | Moore et al. ........................ 328/97 |
| 4,052,558 | 10/1977 | Patterson ............................. 375/84 |
| 4,063,220 | 12/1977 | Metcalfe et al. ............. 340/147 LP |
| 4,099,024 | 7/1978 | Boggs et al. ...................... 178/71 R |
| 4,271,523 | 6/1981 | Gable ............................... 340/825.5 |

FOREIGN PATENT DOCUMENTS

2007944 5/1979 United Kingdom .

Primary Examiner—James J. Groody
Attorney, Agent, or Firm—Barry Paul Smith; W. Douglas Carothers, Jr.

[57] ABSTRACT

A data communication system includes a communicating medium and a plurality of transceivers connected to the medium, each including a transmitter for transmitting phase-encoded data onto the medium and a receiver for receiving phase-encoded data communicated on the medium by another transceiver. A digital phase decoder is coupled to the receiver of each transceiver for decoding the data received and applying at its output a decode signal representative of the character of the received data. The received data comprises a plurality of bitcells each of a predetermined time period with a predetermined number of bitcells representing a data packet. The decoder includes a combination signal generating means and counter means to ascertain, relative to each bitcell in a packet, where any transitional change has occurred in relation to each packet bitcell, the point of occurrence being representative of one of several possible conditions relative to the decoded signal, those conditions being indicative of either a data transition from a low state to a high state or a data transition from a high state to a low state or an illegal transition treated as a data collision.

8 Claims, 11 Drawing Figures

| INPUTS | | | | OUTPUTS | | | COMMENT |
|---|---|---|---|---|---|---|---|
| PD CARRIER | PD OLD | PD NEW | PD CNT | PD CARRIER | PD EVENT | CNTCTRL | |
| LOW | LOW | LOW | D/C | LOW | NO EVENT | COUNT | IDLE |
| LOW | LOW | HIGH | D/C | HIGH | ONE | RESET | START OF PACKET (START BIT) |
| LOW | HIGH | LOW | D/C | HIGH | COLLISION | RESET | IMPOSSIBLE |
| LOW | HIGH | HIGH | D/C | LOW | NO EVENT | COUNT | IMPOSSIBLE |
| HIGH | LOW | LOW | 0-1 | HIGH | COLLISION | COUNT | TOO MANY TRANSITIONS |
| HIGH | HIGH | LOW | 0-1 | HIGH | COLLISION | COUNT | TOO MANY TRANSITIONS |
| HIGH | LOW | HIGH | 2-4 | HIGH | NO EVENT | COUNT | SETUP TRANSITION (ZERO NEXT) |
| HIGH | HIGH | LOW | 2-4 | HIGH | NO EVENT | COUNT | SETUP TRANSITION (ONE NEXT) |
| HIGH | LOW | HIGH | 5-9 | HIGH | ONE | RESET | DATA TRANSITION |
| HIGH | HIGH | LOW | 5-9 | HIGH | ZERO | RESET | DATA TRANSITION |
| HIGH | LOW | HIGH | 10-15 | HIGH | COLLISION | RESET | TOO FEW TRANSITIONS |
| HIGH | HIGH | LOW | 10-15 | HIGH | COLLISION | RESET | TOO FEW TRANSITIONS |
| HIGH | LOW | LOW | 0-11 | HIGH | NO EVENT | COUNT | ACTIVE |
| HIGH | HIGH | HIGH | 0-11 | HIGH | NO EVENT | COUNT | ACTIVE |
| HIGH | LOW | LOW | 12-15 | LOW | COLLISION | RESET | END OF PACKET |
| HIGH | HIGH | HIGH | 12-15 | HIGH | COLLISION | RESET | JAM |

"IMPOSSIBLE" CONDITIONS CAN HAPPEN RIGHT AFTER POWER UP.
D/C MEANS "DON'T CARE"

FIG. 6

| INPUTS | | | | | OUTPUTS | | | |
|---|---|---|---|---|---|---|---|---|
| STATE | COLLISION | PDEVENT | PDCARRIER | SRFULL | STATE | COLLISION | RXDATA | RXSRCTRL |
| IDLE | — | — | FALSE | — | IDLE | FALSE | LOW | HOLD |
| IDLE | — | NOEVENT | TRUE | — | MAYBE | FALSE | LOW | HOLD |
| IDLE | — | COLL./ZERO | TRUE | — | MAYBE | TRUE | LOW | HOLD |
| IDLE | — | ONE | TRUE | — | MAYBE | FALSE | HIGH | LOAD |
| MAYBE | FALSE | — | — | — | IDLE | FALSE | LOW | HOLD |
| MAYBE | TRUE | — | — | — | IDLE | TRUE | LOW | LOAD |
| MAYBE | • | — | FALSE | — | MAYBE | • | LOW | HOLD |
| MAYBE | — | NOEVENT | TRUE | — | MAYBE | TRUE | LOW | HOLD |
| MAYBE | — | COLLISION | TRUE | — | MAYBE | • | LOW | HOLD |
| MAYBE | • | ONE/ZERO | TRUE | FALSE | MAYBE | • | HIGH/LOW | SHIFT |
| MAYBE | • | ONE/ZERO | TRUE | TRUE | FULL | • | HIGH/LOW | SHIFT |
| FULL | • | — | FALSE | — | IDLE | • | LOW | LOAD |
| FULL | • | NOEVENT | TRUE | — | FULL | • | LOW | HOLD |
| FULL | • | COLLISION | TRUE | — | FULL | TRUE | LOW | HOLD |
| FULL | • | ONE/ZERO | TRUE | — | IMIP | • | HIGH/LOW | SHIFT |
| IMIP | • | — | FALSE | — | IDLE | • | LOW | LOAD |
| IMIP | • | NOEVENT | TRUE | — | IMIP | • | LOW | HOLD |
| IMIP | • | COLLISION | TRUE | — | IMIP | TRUE | LOW | HOLD |
| IMIP | • | ONE/ZERO | TRUE | FALSE | IMIP | • | HIGH/LOW | SHIFT |
| IMIP | • | ONE/ZERO | TRUE | TRUE | FULL | • | HIGH/LOW | SHIFT |
| UNUSED | • | — | — | — | IDLE | • | LOW | HOLD |

FIG. 8

| INPUTS | | | | | | OUTPUT | | | | |
|---|---|---|---|---|---|---|---|---|---|---|
| STATE | PDCARRIER | COLLISION | TRANSMIT ENABLE | GOTBIT | SREMPTY | STATE | TXGO | TRANSMIT DISABLED | STARTBIT | TXSRCTRL |
| — | — | — | FALSE | — | — | IDLE | FALSE | TRUE | LOW | HOLD |
| IDLE | TRUE | — | TRUE | — | — | IDLE | FALSE | FALSE | LOW | HOLD |
| IDLE | FALSE | — | TRUE | — | — | MARK | TRUE | FALSE | LOW | HOLD |
| MARK | — | — | TRUE | FALSE | — | MARK | TRUE | FALSE | HIGH | HOLD |
| MARK | — | — | TRUE | TRUE | — | DATA | TRUE | FALSE | HIGH | LOAD |
| DATA | — | — | TRUE | FALSE | — | DATA | TRUE | FALSE | LOW | HOLD |
| DATA | — | — | TRUE | TRUE | FALSE | DATA | TRUE | FALSE | LOW | SHIFT |
| DATA | — | FALSE | TRUE | TRUE | TRUE | DATA | TRUE | FALSE | LOW | LOAD |
| DATA | — | TRUE | TRUE | TRUE | TRUE | — | TRUE | FALSE | LOW | SHIFT |

*FIG. 11*

DIGITAL PHASE DECODER WITH COLLISION DETECTION

BACKGROUND OF THE INVENTION

This invention relates to phase decoders and more particularly, to a digital phase decoder for a data communication system of the type comprising a communicating medium, a plurality of transceivers connected to the medium, and means for interrupting the transmission of data onto the medium by one transceiver when that same transceiver receives data transmitted by another transceiver.

An example of a data communications system of the above-type is disclosed in U.S. Pat. No. 4,063,220. As described in that patent, a collision detector is provided with each transceiver for detecting when the data on the medium differs from the data being communicated by the associated transceiver. A detected difference indicates a "collision" between the signal being transmitted by the associated transceiver and a signal from another transceiver. In response to the detected collision, a collision signal is generated. This signal is then sensed by appropriate means to interrupt transmission by the associated transceiver.

As also described in U.S. Pat. No. 4,063,220, data received by a transceiver connected to the communicating medium is forwarded to a phase decoder which basically separates the data and clock components of the received data. Both data and clock component signals are then respectively applied to the data and clock inputs of a shift register. The shift register converts the serial input data stream into parallel data words of predetermined bit-length, e.g., 16-bit words, for transmittal through a synchronizing buffer register onto a data bus for transfer to a using device.

One problem with phase decoders of the type disclosed in U.S. Pat. No. 4,063,220, is that they use analog circuitry, at least in part, to separate the clock and data components of the phase encoded input. As is well known, analog circuitry tends to drift out of adjustment, which may cause decoding inaccuracies. Further, a completely digital phase decoder is more amemable to microelectronics integration.

SUMMARY OF THE INVENTION

To overcome the above problem, I set out to design and did design a completely digital phase decoder for use in a data communication system of the type disclosed in U.S. Pat. No. 4,063,220. What emerged from this new design, however, was a completely new way of detecting collisions. More specifically, using the more precise decoding characteristics of a completely digital phase decoder, I simply treated all "illegal" data bits or transitions, i.e., those that are not either "data transitions" or "set-up transitions" (to be defined below), as "collisions". Traditionally, systems having such a phase decoder would have ignored all illegal or malformed bits. I use them to signify a collision on the medium and then interrupt the on-going transmission by the subject transceiver in response to a detected collision.

In accordance with the invention, therefore, a digital phase decoder capable of receiving and decoding phase encoded data is provided comprising means for synchronizing received phase-encoded data with the frequency of a predetermined clock signal; means coupled to the output of said synchronizing means for developing a pair of output signals respectively indicative of the state of the received phase-encoded data at two successive clock periods; means for counting the periods of said clock signal; and means coupled to said developing means and said counting means for generating a decode signal representative of the character of the received data.

In accordance with the preferred embodiment, the phase decoder provides a 2-bit "PDEVENT" signal output which describes the character of the phase-encoded data received at its input. For example, a "11" PDEVENT signal may be used to signify a binary one (1) data bit input, whereas a "10" PDEVENT signal may be used to signify a binary zero (0) data bit input. A "01" PDEVENT signal may be used to signify an illegal bit, i.e., a transition occurring at an illegal time. As will be recalled, all such illegal transitions are characterized as "collisions" on the medium.

A "transition" is a change in the value of the communicating medium from high to low or low to high. A transition may signal a new bit of information ("data transition") or a transition required by the coding scheme ("set-up transition").

Also in accordance with the preferred embodiment, the 2-bit PDEVENT signal is applied to a receiver control circuit which decodes that signal. When the PDEVENT signal indicates a collision, i.e., "01," a COLLISION signal is generated and applied to a transmitter control circuit which then disables a phase encoder. The phase encoder supplies phase-encoded digital data to the transmitter portion of the associated transceiver for communication on the medium. The transmitter control circuit, upon receipt of a collision indication from the COLLISION signal, also supplies a status signal (TRANSMIT DISABLED) to the central processing unit (CPU) of the overall workstation indicating the interruption of transmission in response to a detected collision. The CPU then turns off a TRANSMIT ENABLE line connected to the phase encoder in order to insure a retransmission will not immediately begin when the PDEVENT signal changes from "01" to another state. Rather, retransmission can occur only when the CPU turns back on the TRANSMIT ENABLE line. This can be done after an internally generated random time delay, such as in the manner described in U.S. Pat. No. 4,063,220.

These and other aspects and advantages of the invention will be described in more detail below with reference to the accompanying drawings.

BRIEF DESCRIPTION OF THE DRAWINGS

FIGS. 5 and 6 are a diagram and table, respectively, showing the relationship between the outputs of the counter and ROM of FIG. 3;

FIG. 8 is a table showing the relationship of the inputs to the outputs of the receiver control circuit of FIG. 7;

FIG. 11 is a table showing the relationship of the inputs to the outputs of the transmitter control circuit of FIG. 10.

DESCRIPTION OF THE PREFERRED EMBODIMENT

Figure 1:
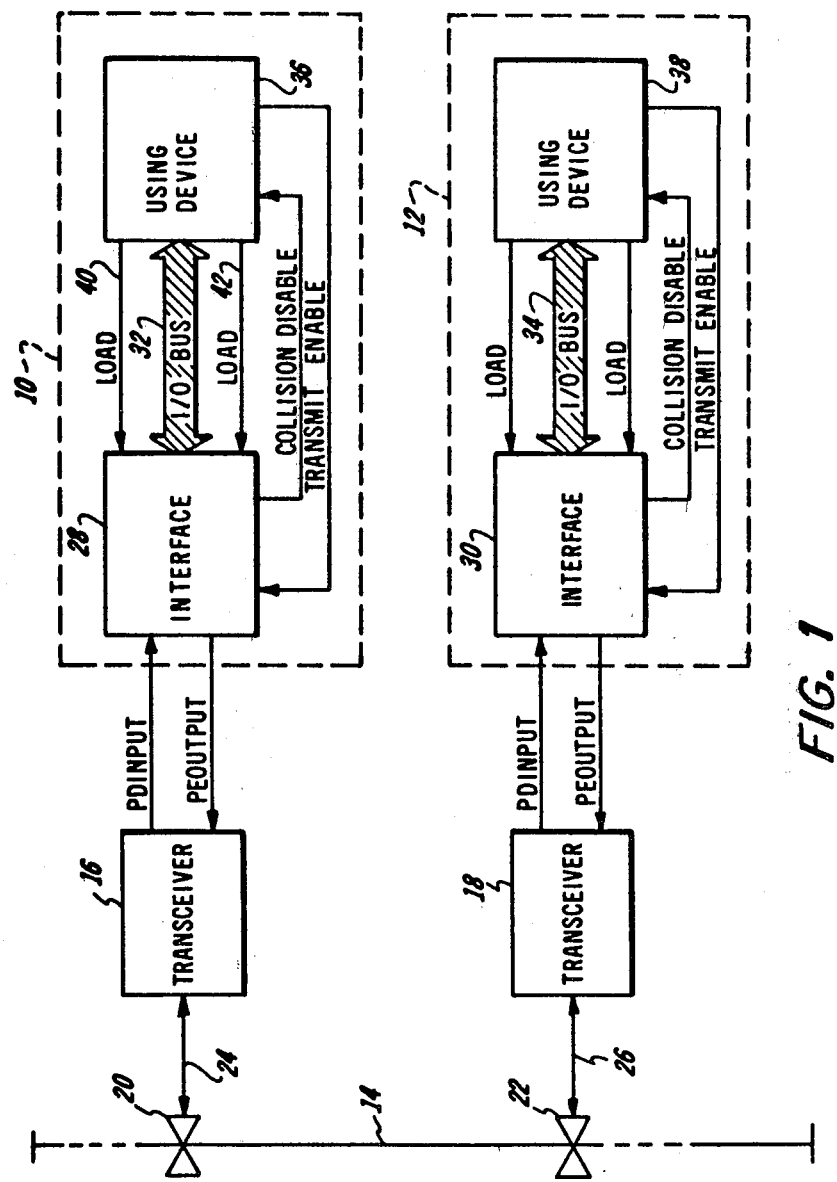
FIG. 1 is a schematic block diagram of a data communication system of the present invention.

Referring to FIG. 1, a data communication system is shown comprising a plurality of workstations 10 and 12 (only two shown for simplicity). Each workstation 10 and 12 is connected to a transceiver 16 and 18, respectively, for transmitting phase-encoded digital data onto and receiving such data from a communicating medium 14, such as a coaxial cable. In this respect, each transceiver 16 and 18 is connected to the cable 14 by means of a tap 20 and 22, respectively, and coupling lines 24 and 26, respectively.

It should be noted that the representation of the communicating medium 14 as a coaxial cable is merely by way of example, as the invention is equally well suited for transmission and reception over any communicating medium. The nature of the transceivers 16 and 18 would, of course, have to be tailored to the specific type of medium employed. Whatever the medium, the intention is to be able to communicate encoded digital data among a plurality of workstations, such as stations 10 and 12, which may be either in the same room, same building, different buildings, and even different cities, depending upon the nature of the communicating medium and associated transceivers 16 and 18 employed. In fact, there may be a whole host of different communicating mediums interconnected by "repeaters" (not shown), whose primary function would be to accept phase-encoded digital data communicated on one communicating medium and transfer that data onto another communicating medium, which may be of the same or different type. Thus, it is not essential that workstations 10 and 12 be connected to the same communicating medium, or even the same type of communicating medium, so long as appropriate repeaters are employed. One type of repeater that may be employed in the system of FIG. 1 is disclosed in U.S. Pat. No. 4,099,024.

Referring now more specifically to the workstations 10 and 12 as depicted in FIG. 1, the transceivers 16 and 18 each receive incoming encoded digital data from the medium 14 along lines 24 and 26, respectively. This incoming data is applied as a PDINPUT signal to respective interface circuits 28 and 30. Each interface circuit 28 and 30 includes means to be described below for decoding the incoming serial data and converting it into parallel format for application over a respective I/O bus 32 and 34 to a respective using device 36 and 38. The using devices 36 and 38 may be the same or different type devices, each capable of using the received data. For example, the using devices may be data processors, word processors or personal computers.

Each interface circuit 28 and 30 further includes means also to be described below for generating a two-bit PDEVENT signal indicative of the character of the incoming data, as well as a single bit PDCARRIER signal which, when true, indicates that the communicating medium 14 is in use. A true PDCARRIER signal is interpreted by the transmit control circuitry in the respective interface circuit to prevent the initiation of a transmission by the associated transceiver 16 and 18.

The specific manner by which the interface circuit prevents the initiation of a transmission will be described below.

Referring now to the manner by which each workstation 10 and 12 transmits encoded digital data onto the communicating medium 14, each using device 36 and 38 initiates an intended transmission by forwarding non-encoded digital data in bit-parallel format over the respective I/O bus 32 and 34 to the respective interface circuit 28 and 30. Each interface circuit 28 and 30 includes means to be described below for converting the parallel data into serial data and then phase-encoding such data for application as a PEOUTPUT signal to the respective transceiver 16 and 18. Each using device 36 and 38 also generates a pair of LOAD signals which are applied to the respective interface 28 and 30 to control the loading of data between such interface and the respective I/O busses 32 and 34, as will be discussed below.

Figure 2:
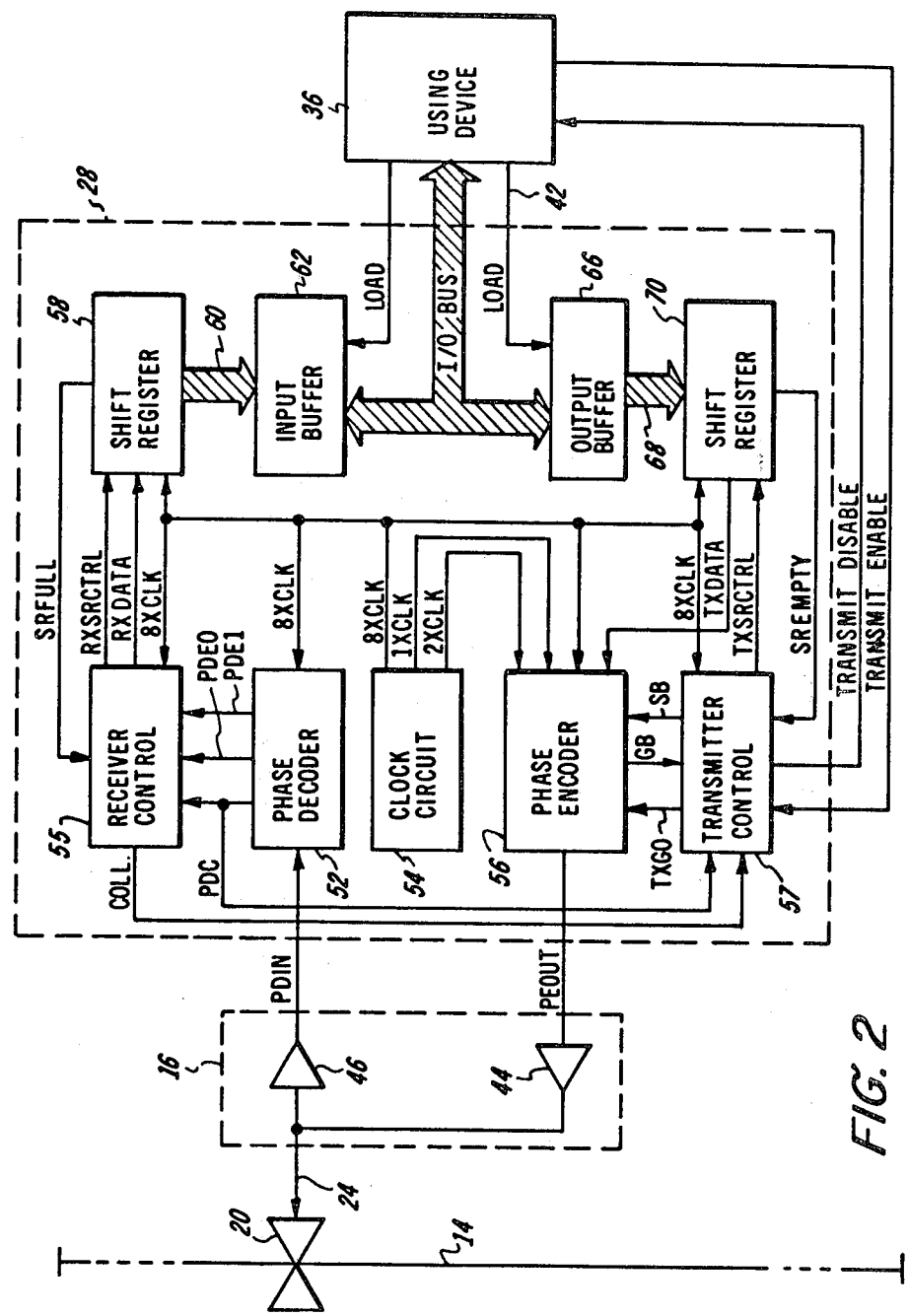
FIG. 2 is a more detailed block diagram of one of the workstations depicted in FIG. 1.

Referring to FIG. 2, a typical workstation will be described with reference to workstation 10 depicted in FIG. 1. As shown, the transceiver 16 includes a driver or transmitter 44 and a receiver 46. The input of the receiver 46 is connected to the input-output line 24 and to the output of the transmitter 44. In this manner, the receiver 46 receives not only incoming encoded digital data from the communicating medium 14, but also the encoded digital data transmitted by the transmitter 44 onto the medium 14. It is thus possible, as will be described below, for the workstation 10 to detect a collision on the medium 14 between the signal being transmitted by the transmitter 44 and another signal received by the receiver 46 from another workstation's transceiver.

Figure 4:
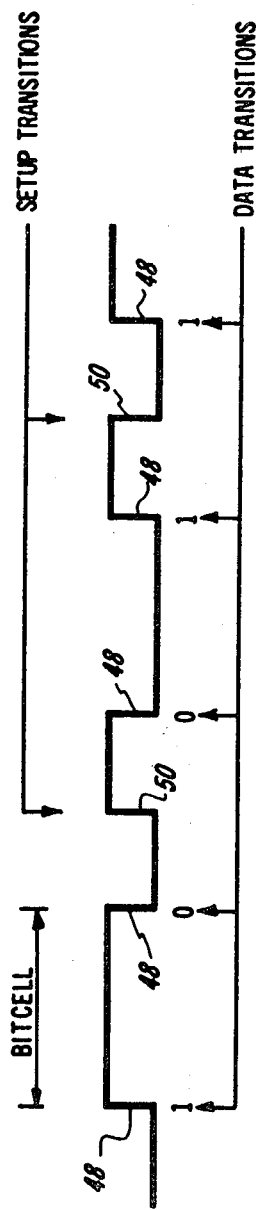
FIG. 4 is an exemplary waveform of the phase encoded serial data received by the phase decoder of FIG. 3.
Figure 5:
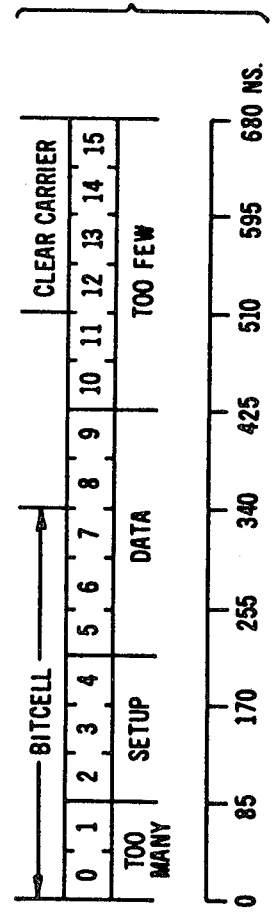

The encoded digital data capable of being transmitted and received by the workstations 10 and 12 is preferably "Bi-Phase-L" encoding, which satisfies certain basic rules as depicted in FIGS. 4 and 5. As shown in FIG. 4, there is a data transition 48 once per bit cell and its direction (low-to-high equals one) is the value of the bit. Midway between these data transitions 48, there may be a "setup" transition 50 to get into position for the next data transition. More specifically, if it is desired to transmit the code "10011", it would be necessary to have setup transitions in the second and fourth bit cells, as shown in FIG. 4. Thus, whenever it is necessary to generate two successive bits of the same state, it is necessary to generate a set-up transition mid-way between the two data transitions.

In phase encoding, a bit cell may be thought of as extending from one data transition to another, with possible set-up transitions in the middle. Alternatively, it may be thought of as centered on the data transition, with the set-up transitions occurring at the bit cell boundaries. Both conventions may be used. More specifically, when thinking about phase decoding, data transitions may be considered as occurring at the bit cell boundaries, but when thinking about plate encoding, they may be considered as occurring in the center of bit cells.

All data is transmitted in "packets." Each packet begins with a one bit which is called the "start bit." Packets end when no transitions are detected for more than 1.5 bit times and no incoming data is received from the communicating medium 14. Transmitters "jam" the communicating medium 14 with a continuous high level signal (no transitions) for several bit times after detecting a collision. Collisions are of four types, i.e., (1) too many transitions, in which two transitions occur within 0.25 bit times, (2) too few transitions, in which a transition occurs between 1.25 and 1.5 bit times after the last one, (3) end-of-packet (EOP), in which no transitions occur for more than 1.5 bit times and no incoming data is received from the communicating medium 14, and (4) jam, which is the same as EOP, except that the communicating medium 14 will be at a continuous high level for several bit times, as indicated above. Of course, a type (3) collision (EOP) is normal at the end of a good packet, and a type (4) collision (jam) is normal at the end of a packet that contains a type (1) or (2) collision. They are all violations of the encoding rules.

Continuing now with a description of FIG. 2, the output of the receiver 46 is connected to the data input of a phase decoder 52 for supplying phase-encoded digital data (PDINPUT) received from the medium 14 to the phase decoder 52. The phase decoder 52 also receives a clock signal (8XCLK) from a clock circuit 54. The clock signal 8XCLK preferably has a frequency eight times that of the basic bit rate of the phase-encoded data as defined by a 1XCLK clock signal generated by the clock circuit 54. A third clock signal 2XCLK is also generated by the clock circuit 54. Both clock signals 1XCLK and 2XCLK are supplied to the transmitter portion of the interface circuit 28 for reasons to be described below. In the preferred embodiment, the basic bit rate or frequency of the 1XCLK signal is 2.94 Megahertz (340 ns period), the frequency of the 2XCLK signal is 5.88 Megahertz (170 ns period), and the frequency of the 8XCLK signal is 23.53 Megahertz (42.5 ns period).

The primary purpose of the phase decoder 52 is to identify the character of the received data, i.e., to decode the data. The manner in which it does this will be described below. At this time, however, it should be noted that the phase decoder 52 generates a PDCARRIER signal whenever the communicating medium 14 is in use by the subject transceiver 16 or by the transceiver of another workstation communicating on the medium 14. The phase decoder 52 also generates a 2-bit PDEVENT signal which is the vehicle for identifying the character of the incoming data. In the preferred embodiment, the PDEVENT signal signifies the following characterizations of the incoming data:

| PDEVENT | Meaning |
| --- | --- |
| 00 | No Event |
| 01 | Collision |
| 10 | Data Zero (0) |
| 11 | Data One (1) |

The PDCARRIER and PDEVENT signals are supplied from the phase decoder 52 to respective inputs of a receiver control circuit 55. The receiver control circuit 55 also receives as inputs the 8XCLK signal from the clock circuit 54 and an SRFULL, signal from a shift register 58. The SRFULL signal will be true whenever the next bit shifted into shift register 58 will make it full. Whenever the PDEVENT signal indicates a collision, i.e., "01," the receiver control circuit 55 generates a true COLLISION signal which is applied to an input of a transmitter control circuit 57 for a purpose to be described below. Further, whenever the PDEVENT signal indicates a data zero or data one, i.e., "10" or "11," an RXDATA signal is respectively made low or high, such signal being applied to the data input of the shift register 58. The receiver control circuit 55 also generates a 2-bit RXSRCTRL signal to control the operation of the shift register 58, as will also be described below.

The shift register 58 is preferably 16-bits in length and is thus capable of converting the incoming serial data stream (RXDATA) into 16-bit words, which are supplied in bit-parallel format along a bus 60 to an input buffer register 62. The input buffer register 62 loads the parallel data from the shift register 58 onto a main I/O bus 32 for application to the using device 36. This load operation is controlled by the state of a LOAD control signal from the using device 36 along a line 40.

Still referring to FIG. 2, the manner in which digital data is phase-encoded for transmission onto the medium 14 will be described. First, non-encoded digital data to be transmitted is forwarded by the using device 36 in bit-parallel format (16-bit words) over the I/O bus 32 to an output buffer register 66. When instructed by a LOAD control signal from the using device 36 along a line 42, the buffer register 66 loads a 16-bit word from the I/O bus 32 onto a bus 68 for application to a shift register 70.

The shift register 70 has the 8XCLK signal connected to its clock input and is, therefore, clocked at the 23.53 Megahertz bit rate. A 2-bit TXSRCTRL control signal from the transmitter control circuit 57 is applied to the control input of the shift register 70 for controlling the operation thereof in a manner to be described below. The shift register 70 generates an SREMPTY signal which is true when the shift register 70 has shifted 15 times so that the bit at its serial output is the last valued bit. The SREMPTY signal is applied to the transmitter control 57 for notifying the latter of that condition. The data output of the shift register 70 is connected to the data input of the phase encoder 56 for supplying a non-encoded serial TXDATA signal thereto.

The phase encoder 56 is clocked by all three clock signals (1XCLK, 2XCLK and 8XCLK) in a manner by which the TXDATA signal supplied thereto from the shift register 70 is encoded in accordance with the "Bi-Phase-L" encoding principles discussed above in connection with FIGS. 4 and 5. The phase encoder 56 also receives a TXGO signal from the transmitter control circuit 57 which, when false, effectively prevents the initiation of a transmission or interrupts an ongoing transmission. The phase encoder 56 further receives a STARTBIT (SB) signal from the transmitter control circuit 57 which will be true at the start of a packet and false after receipt of the first GOTBIT signal. Each time the phase encoder 56 receives a bit of TXDATA from the shift register 70, it informs the transmitter control circuit 57 of this condition by generating a true GOTBIT (GB) signal for one 8XCLK period, which is supplied to an input of the transmitter control circuit 57.

The transmitter control circuit 57 will generate a false TXGO signal for application to the phase encoder 56 whenever the PDCARRIER signal applied to the circuit 57 from the phase decoder 52 goes true prior to the initiation of a transmission by the interface 28 and transmitter 44. Such a true PDCARRIER signal indicates the receipt by the receiver 46 of a signal from another workstation. Additionally, the TXGO signal will go false whenever the COLLISION signal applied to an input of the transmitter control circuit 57 from the receiver control goes true, signifying that a signal from another workstation was received during the time the interface 28 and transmitter 44 were transmitting a signal onto the medium 14. Looking at it another way, in order to begin transmitting, i.e., to generate a true TXGO signal, all of the following conditions must hold: (1) The using device 36 must have given its permission to transmit by generating a true TRANSMIT ENABLE signal, (2) the communicating medium must not be in use, i.e., the PDCARRIER signal generated by the phase decoder 52 must be false, and (3) there must be data available to transmit, i.e., at a minimum the shift register 70 must contain a word. Further, in order to continue a transmission, i.e., to continue TXGO at a true value, none of the following conditions must hold: (1) the using device 36 revokes permission to transmit by setting TRANSMIT ENABLE to false, (2) a collision is detected, and (3) internal consistency checks in the transmitter portion of the interface 28 indicate a hardware failure.

Whenever the transmitter control circuit 57 issues a false TXGO signal, it also issues a true TRANSMIT DISABLED signal, which is applied from an output of the circuit 57 to the using device 36 to notify the latter of that condition. The using device 36 will then change the state of the TRANSMIT ENABLE signal from true to false that it applies to an input of the transmitter control circuit 57. Whenever the TRANSMIT ENABLE signal is false, the transmitter control circuit 57 is constrained to issue a false TXGO signal to the phase encoder 56 with the results discussed above. Thus, if the using device 36 simply wanted to abort an ongoing transmission even though no collision occurred, it could issue a false TRANSMIT ENABLE signal.

It will be appreciated that the changing of states of the TRANSMIT ENABLE signal from true to false, due to a disablement of transmission (future or ongoing) by the transmitter control circuit 57 and notification there of to the using device by the issuing of a true TRANSMIT DISABLED signal, occurs later in time than the initial disablement. However, it provides a reliable back-up disablement. Additionally, and as pointed out earlier, the TRANSMIT ENABLE signal can be changed back to a true state after a random time delay generated internally by the using device 36, even though, for example, the PDEVENT signal may have changed from a collision state (01) to a data state (10). The use of a random time delay feature reduces the likelihood of repeated future collisions. An exemplary random time delay circuit for a using device is disclosed in the aforementioned U.S. Pat. No. 4,063,220.

Figure 3:
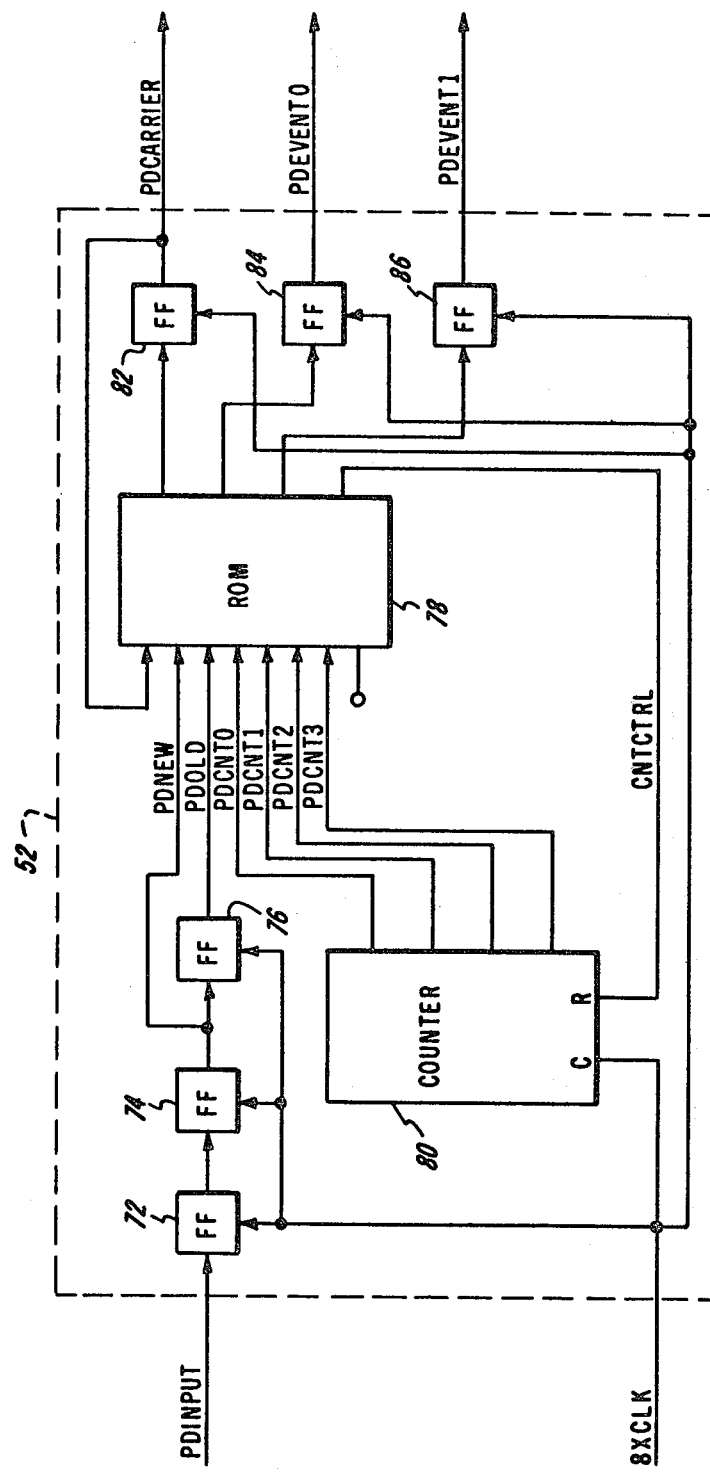
FIG. 3 is a schematic block diagram of the phase decoder shown in FIG. 2.

Reference is now made to FIG. 3 where the presently preferred phase decoder 52 will be described in more detail. As shown, the phase decoder 52 includes three input flip-flops 72, 74 and 76 connected in series, with the input of flip-flop 72 connected to the output of receiver 46 (FIG. 2) for receiving PDINPUT data therefrom, the input of flip-flop 74 connected to the output of flip-flop 72, and the input of flip-flop 76 connected to the output of flip-flop 74. All three flip-flops are clocked simultaneously by the 8XCLK signal applied at their clock inputs. The flip-flop 72 essentially serves as a synchronizer to synchronize the PDINPUT data to the rate of the 8XCLK signal. The flip-flop 74 is essentially a dual function device, in that it serves a synchronizing function like flip-flop 72 and also develops a PDNEW signal that is applied to a read-only-memory (ROM) 78 for comparison with a PDOLD signal developed at the output of the flip-flop 76 and also applied to the ROM 78.

It should be noted that the PDNEW and PDOLD signals represent successive samples of PDINPUT data. When they differ, PDINPUT has changed within the last sample interval. The new value of PDINPUT is PDNEW and the old value is PDOLD.

The phase decoder 52 also includes a digital counter 80 which is capable of counting to 16 and can be reset by a CNTCTRL command signal generated at an output of the ROM 78. The counter 80 is clocked by the 8XCLK signal from the clock circuit 54 (FIG. 2) as applied to its clock input. Inasmuch as the counter 80 is a 16-bit counter, it has four outputs, i.e., PDCNT0, PDCNT1, PDCNT2 and PDCNT3, which are applied to respective inputs of the ROM 78 along with the PDNEW signal from the flip-flop 74 and the PDOLD signal from the flip-flop 76. The ROM 78 also receives as an input the PDCARRIER signal fedback from the output of a flip-flop 82 which is connected to an output of the ROM 78.

The ROM 78 is capable of providing four different output signals at respective outputs thereof, i.e., PDCARRIER, PDEVENT0, PDEVENT1 and CNTCTRL. As indicated above, the CNTCTRL signal is applied to the reset input of the counter 80 for resetting same. The PDCARRIER signal is applied to the input of a flip-flop 82 which is latched at the occurrence of the next 8XCLK pulse applied at its clock input, to thereby present the PDCARRIER signal at the output of flip-flop 82. Likewise, the PDEVENT0 and PDEVENT1 pulse signals are applied to the inputs of a respective pair of flip-flops 84 and 86 and are manifest at the outputs of such flip-flops when clocked by the next occurring 8XCLK signal pulse.

The operation of the digital phase decoder 52 will now be described with reference to FIGS. 3-6. Let us assume that no signal has yet been applied to the phase decoder 52 and thus the outputs of flip-flops 72, 74, 76, 82, 84 and 86 are all binary zero. Now then, assume the phase-encoded signal PDINPUT depicted in FIG. 4 is applied to the input of flip-flop 72. Since this signal is free of collisions or illegal transitions, it must indicate either that only the transmitter 44 is transmitting onto the medium 14, since the transmitted signal will be received by the receiver 46, or that only another workstation is communicating on the medium 14, such signal also being received by the receiver 46.

At the first occurring 8XCLK pulse, the low-to-high (binary 1) transition of the PDINPUT signal of FIG. 4 is latched onto the output of flip-flop 72. At the second 8XCLK pulse, the flip-flop 74 will latch the binary 1 signal at its output. At this moment, PDNEW will change from binary 0 to binary 1, whereas PDOLD will remain binary 0. This condition signifies the start of a packet, as indicated in FIG. 6. In response, the ROM 78 is programmed to raise the CNTCTRL output, thereby resetting the counter 80. Additionally, the PDCARRIER output of the ROM 78 is raised, so that the PDCARRIER signal at the output of flip-flop 82 will go true at the next 8XCLK pulse, i.e., the flip-flop 82 will be latched at the next 8XCLK pulse. In addition to raising the PDCARRIER and CNTCTRL outputs, the PDEVENT0 and PDEVENT1 output lines are both raised, signifying a binary 1 bit of data received. At the next 8XCLK pulse, the outputs of flip-flop 84 and 86 will reflect this condition. The PDEVENT0 and PDEVENT1 output lines will remain high for only one 8XCLK period and will then revert to the "00" state, i.e., "NO EVENT."

With continued reference to the PDINPUT signal of FIG. 4, the counter 80 will continue to count up to count 7 (FIG. 5), at which time the PDNEW signal will go low with the PDOLD signal still high, since the next data transition will occur at the boundary of the next bit cell. The ROM 78 is programmed to interpret this condition as a data transition and to maintain the PDCARRIER output line raised (binary 1). Additionally, it will again reset the counter 80 by raising the RESET output. Further, it will change the state of the PDEVENT0 line from binary 0 to binary 1, as shown in FIG. 6. Thus, the PDEVENT signal (10) will signify that the data transition was a binary 0.

It will be appreciated that the ROM 78, among other functions, is performing an exclusive-OR function relative to the PDNEW and PDOLD inputs. That is how it detects the occurrence of a transition. By then looking at the value of the count from counter 80, it can ascertain whether the transition was a legal data or set-up transition, or an illegal transition ("collision"). The ROM program is set out in table form in FIG. 6.

As a result of dispersion in the communicating medium 14 and asymmetric rise and fall times in the logic circuitry of the workstation 10, transitions may "jitter," i.e., not occur at precisely the expected time. The phase decoder 52 tolerates ±12.5% jitter, as well as a ±25% difference in speed between a transmitter and this receiver, as shown in FIG. 5. As a result of this relationship, any transition that occurs during the first two 8XCLK periods following a data transition 48 is an illegal transition or collision; any transition that occurs during the third through fifth 8XCLK periods following a data transition 48 is a set-up transition 50; any transition that occurs during the sixth through tenth 8XCLK periods following a data transition is a data transition 48; and any transition that occurs during the eleventh through sixteenth 8XCLK period is an illegal transition and deemed a collision. These rules are depicted in FIGS. 5 and 6.

In response to an illegal transition, such as one occurring at a count of 1 by counter 80 (too many), the ROM 78 will generate a PDEVENT=01 condition signifying a collision. The collision may be actual, i.e., a signal from another workstation was received during the time the transmitter 44 was transmitting, or only noise. Nevertheless, both are treated as collisions with the same results. The PDEVENT=01 signal is supplied to the receiver control circuit 55 (FIG. 2), which then generates a true COLLISION signal for disabling the phase encoder 56 in the manner described above. Upon such disablement, by issuing a false TXGO signal to the phase encoder 56, the transmit control circuit 57 also issues a true TRANSMIT DISABLED signal to the using device 36. The using device 36 will then turn off the TRANSMIT ENABLE signal, so that a retransmission can begin only when the PDEVENT=01 condition changes and the using device 36 turns back on the TRANSMIT ENABLE line after a random time delay to reduce the probability of repeated collisions. Further, when the transmitter 44 is not transmitting and the receiver 46 nonetheless receives a signal from another workstation, the PDCARRIER signal will disable the phase encoder 56 from initiating a transmission, as explained above.

Figure 7:
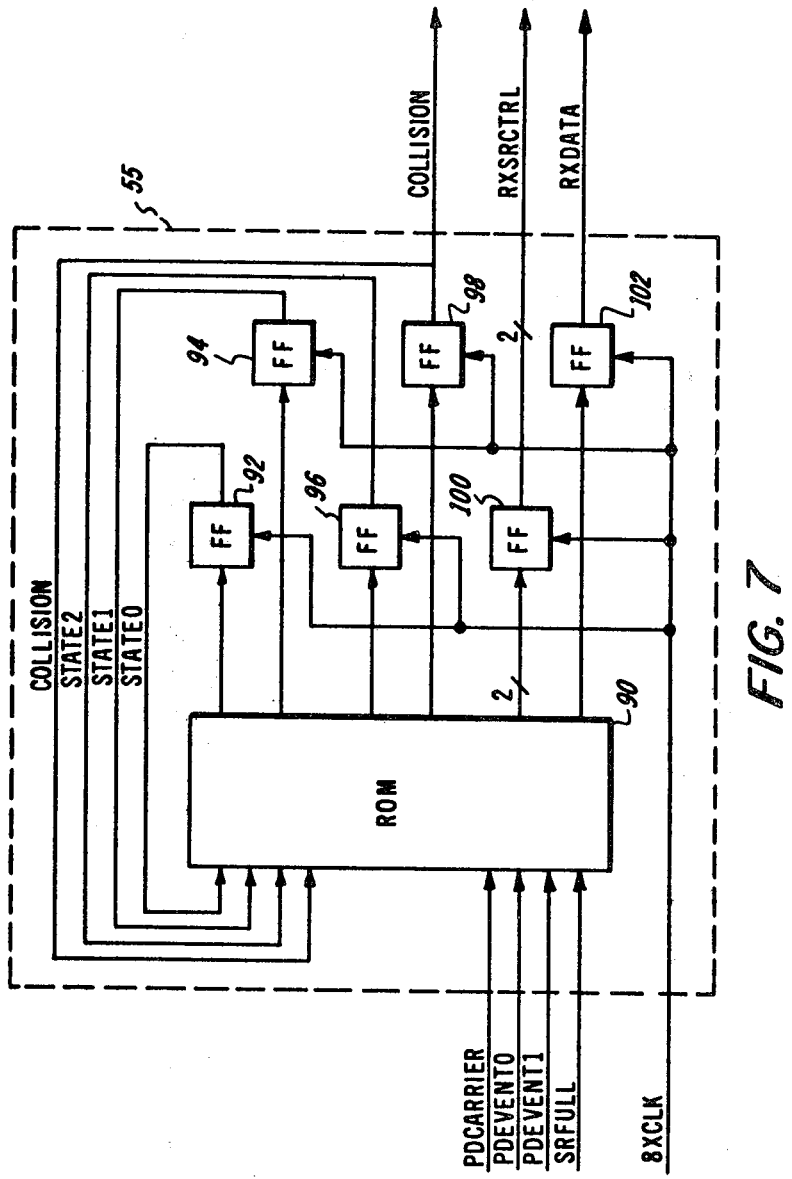
FIG. 7 is a schematic block diagram of the receiver control circuit depicted in FIG. 2.

Referring to FIG. 7, the receiver control circuit 55 depicted in FIG. 2 will be described. As shown, the circuit 55 includes a ROM 90 having eight input lines as follows:

(1)–(3) STATE—A three-bit signal developed at respective outputs of the ROM 90, latched in respective output flip-flops 92, 94 and 96, and fedback to respective inputs of the ROM 90. The various states and their significance will be described below.

(4) COLLISION—This signal is developed at an output of the ROM 90, latched in a flip-flop 98, and fedback to a respective input of the ROM 90. The COLLISION signal will be true when the PDEVENT signal indicates a collision ("01"). It is fedback to an input of the ROM 90 to inform the latter if a collision occurred anytime during the transmission of a packet.

(5) PDCARRIER—This signal is supplied from the output of the phase decoder 52.

(6)–(7) PDEVENT—This two-bit signal is supplied from respective outputs of the phase decoder 52.

(8) SRFULL—This signal is supplied from the shift register 58 to inform the ROM 90 when the next bit shifted into shift register 58 will make it full.

In addition to the four output lines from ROM 90 just discussed, the ROM 90 also generates the RXSRCTRL signal and the RXDATA signal at respective outputs. These signals are latched in flip-flops 100 and 102, respectively, for application to the shift register 58, as explained above. All six flip-flops 92–102 are latched by the 8XCLK signal applied to their respective clock inputs. Since the RXSRCTRL signal is a two-bit signal, there are really two separate flip-flops 100 and respective output lines. Only one is shown for simplicity.

A presently preferred program for ROM 90 is set forth in table form in FIG. 8, where each of the various "states" are identified and will now be described as follows:

(1) IDLE—In this state, the beginning of a packet is being awaited.

(2) MAYBE—In this state, the first part of a packet is being processed. No data has yet been loaded into the input buffer register 62 (FIG. 2).

(3) FULL—In this state, the end of a word of PDINPUT data is being processed.

(5) IMIP—In this state, the middle of a word of PDINPUT data is being processed.

It should be noted that the symbol "-" in FIG. 8, as well as in FIG. 11 to be discussed below, means "don't care," i.e., the signal is ignored for the particular row. Additionally, the symbol "•" in FIG. 8 appears only in the COLLISION signal columns and means that if the COLLISION signal input was true, then the COLLISION signal output is true, and that if the COLLISION signal input was false, then the COLLISION signal output is false.

Figure 9:
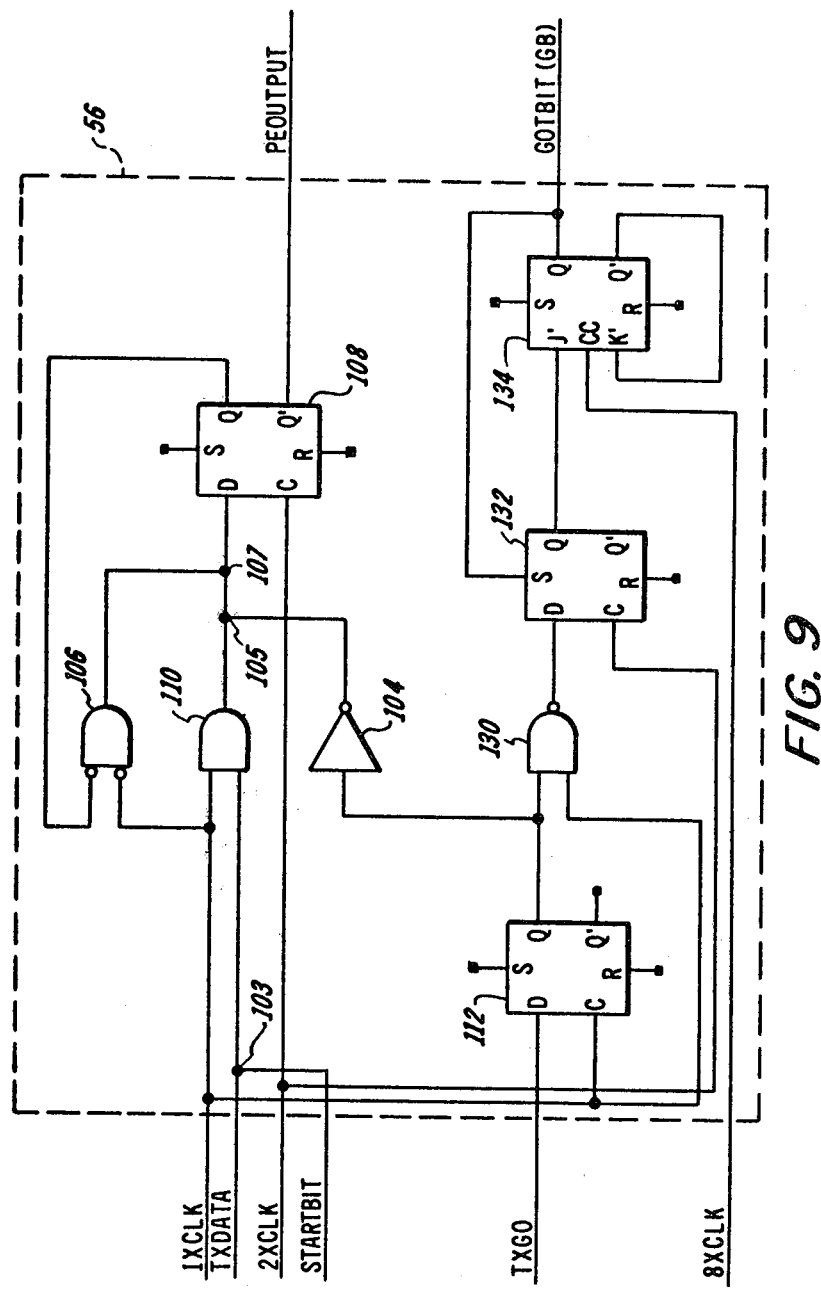
FIG. 9 is a schematic diagram, partly in block form, of the phase encoder depicted in FIG. 2.

Turning now to the transmitter portions of the interface 28, a presently preferred phase encoder 56 will be described with reference to FIG. 9. As shown, the phase encoder 56 includes an AND-gate 110 having one input connected to the data output of the shift register 70 (FIG. 2) for receiving the STARTBIT or TXDATA signal therefrom, as wire-0Red at point 103, and another input connected to the clock circuit 54 (FIG. 2) for receiving the 1XCLK therefrom. The output of the AND-gate 110 is wire-0Red at point 105 with the output of an inverter 104 and is also wire-0Red at point 107 with the output of an inverted-input AND-gate 106. As so wire-0Red, the output of the AND-gate 110 is applied to the data (D) input of a D flip-flop 108.

The Q output of the flip-flop 108 is connected to one input of gate 106 and a second input of gate 106 is connected to the 1XCLK line from the clock circuit 54. The clock (C) input of the flip-flop 108 is connected to the clock circuit 54 for receiving the 2XCLK therefrom. The PEOUTPUT signal of the phase encoder 56 is developed at the Q' output of the flip-flop.

The input of the inverter 104 is connected to the Q output of another D flip-flop 112, the data input of which is connected to the transmitter control circuit 57 (FIG. 2) for receiving the TXGO signal therefrom. The clock input of the flip-flop 112 is connected to the 1XCLK line from the clock circuit 54. The Q output of the flip-flop 112 is also applied to one input of a NAND-gate 130, a second input of which is also connected to the 1XCLK line from the clock circuit 54. The output of the gate 130 is applied to the data input of yet another D-C flip-flop 132, the clock input of which is connected to the clock circuit 54 for receiving the 2XCLK signal therefrom.

The Q output of the flip-flop 132 is connected to the J' input of a J-K flip-flop 134. The clock input of the flip-flop 134 is connected to the 8XCLK line from the clock circuit 54 and the GOTBIT signal generated by the phase encoder 56 is developed at the Q output of the flip-flop 134. The GOTBIT signal, in addition to being applied to the transmitter control circuit 57, is also fedback to the set input of the flip-flop 132. The Q' output of the flip-flop 134 is fedback to the K' input thereof.

In describing the operation of the phase encoder 56, the basic rule for phase encoding should be recalled, i.e., to transmit the complement of the bit value during the first half of a bit cell, and then to send the true value of the bit during the second half.

Now then, let us first consider what happens in the middle of an infinite string of bits. During the last quarter of the preceeding bit cell and the first quarter of the current bit cell, the 1XCLK signal is true, enabling gate 110, which passes TXDATA to the D input of flip-flop 108, which clocks it on the rising edge of the 2XCLK signal. Since PEOUTPUT is the Q-bar output of the flip-flop, it will have the complement of the data value of the bit during the first half of the bit cell. During the middle two quarters of the current bit cell, the 1XCLK signal is false, enabling gate 106, which passes the complement of PEOUTPUT to the D input of flip-flop 108, which looks at it on the rising edge of the 2XCLK signal, at the midpoint of the bit cell. This complements the current value of the flip-flop which is already the complement of the bit value, so the true value of the bit is sent during the second half.

Now we have to worry about starting and stopping a transmission without generating any partial bits (sometimes referred to in the art as "runts" or "glitches"). It should be noted that forcing a high onto point 107 will override whatever gates 106 and 110 are doing, and force flip-flop 108 to always clock in a high, and thus PEOUTPUT will always be low (i.e., off). Note also that flip-flop 108 is clocked twice per bit cell. To shut down the phase encoder 56, we must force a high at point 107 after the clock in the middle of the bit cell, and before the clock at the end of the bit cell (which is also the clock at the beginning of the next bit cell which we don't want to transmit in). To start it up, we must remove the forced high during the same time window. If we change it during the first half of a bit cell, we will generate a half bit "runt."

To avoid "glitches," we must not change the D input of flip-flop 112 near the time when a rising edge occurs at its clock input. Looking around for a signal with these properties, we find that the 1XCLK signal is just what we need. It has a rising edge (for a clock that's usually when the action takes place) ¾ of the way through a bit cell, i.e., ¼ of a bit cell after flip-flop 108 has complemented its output for the second half, and ¼ of a bit cell before it will clock in the (complemented) value of the next bit. That rising edge is in the required window, and far away from the rising edges of the 2XCLK signal. Thus, flip-flop 112 samples TXGO on the rising edge of the 1XCLK signal. Its output forces a high at point 107 to stop the phase encoder 56, or a low to start it, and this signal changes only at times when a whole bit cell will be encoded. Inverter 104 isolates what is going on at point 107 from what is going on at the input to gate 130.

Now we must generate the GOTBIT signal. This signal must go true for one cycle of the 8XCLK signal after flip-flop 108 loads a data bit. It tells ROM 114 (FIG. 10) in the transmitter control circuit 57 that the current bit has been taken and flip-flop 108 won't be looking at TXDATA for a while. This signal must get to ROM 114 in time for it to shift the next bit into position (or parallel load if the last bit emptied the shift register 70) before flip-flop 108 looks again. This will be 340 ns, or one bit time after it looked at the last bit. The rising edge of the 2XCLK signal while the 1XCLK signal is high is the instant when TXDATA is sampled, if the phase encoder is enabled. The output of gate 130 goes low when the 1XCLK signal is high and the phase encoder is enabled; and this is clocked into flip-flop 132 by the rising edge of the 2XCLK signal. Thus, the Q output of flip-flop 132 goes low at the beginning of each bit cell in which the phase encoder is active, and at the same instant the phase encoder flip-flop 108 samples the next data bit.

This level is fed into flip-flop 134, and 8XCLK period later it sets flip-flop 134, which instantly resets flip-flop 132 (which is now ready to repeat its mission long before it will be called on). The next tick of 8XCLK will reset flip-flop 134 because of the feedback from its Q' output to its K input. Thus, the GOTBIT signal goes high for one cycle of the 8XCLK signal, one 8XCLK period after flip-flop 108 samples TXDATA. This leaves ¾ of a bit time (255 ns) for the ROM 114 (FIG. 10) and the shift register 70 to get ready.

Figure 10:
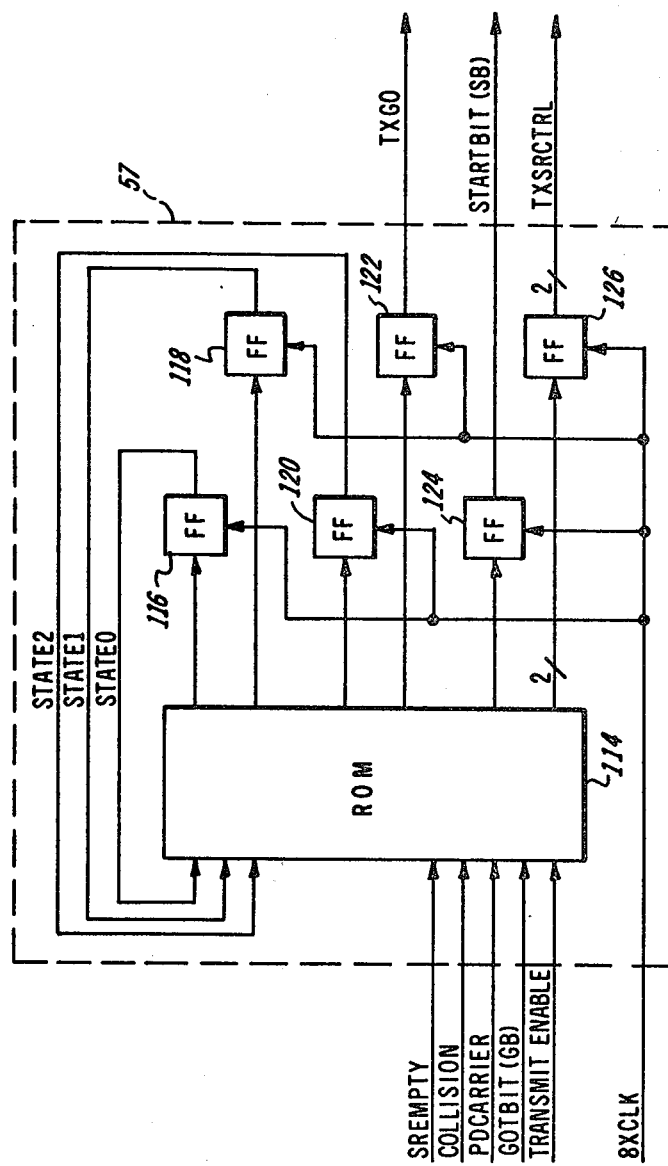
FIG. 10 is a schematic block diagram of the transmitter control circuit depicted in FIG. 2.

Referring to FIG. 10, the transmitter control circuit 57 depicted in FIG. 2 will be described. As shown, the circuit 57 includes the ROM 114 having eight input lines as follows:

(1)-(3) STATE—A three bit signal developed at respective outputs of the ROM 114, latched in respective output flip-flops 116, 118 and 120, and fedback to respective inputs of the ROM 114. The various states and their significance will be described below.

(4) SREMPTY—This signal is developed at the output of the shift register 70 and is true when the register has shifted 15 times so that the bit as its serial output is the last valid bit.

(5) COLLISION—This signal is developed at the output of the receiver control circuit 55 and is true when the PDEVENT signal is "01," signifying a collision.

(6) PDCARRIER—This signal is developed at the output of the phase decoder 52 and is true when the communication medium 14 is in use.

(7) GOTBIT (GB)—This signal is developed at the output of the phase encoder 56 for reasons just described.

(8) TRANSMIT ENABLE—This signal is developed by the using device 36 and is false when a transmission is to be disabled or delayed, as explained above.

In addition to the three STATE output lines from the ROM 114, the ROM 114 also develops the TXGO, STARTBIT (SB) and TXSRCTRL signals referred to earlier. These signals are latched in respective output flip-flops 122, 124 and 126 and then forwarded to the phase encoder 56 (TXGO and SB) and the shift register 70 (TXSRCTRL). All six flip-flops 116–126 are latched by the 8XCLK signal applied to their respective clock inputs. Actually, and as with the case of the RXSRCTRL signal, the TXSRCTRL signal is a two-bit signal, and thus there are really two flip-flops 126 and associated output lines. Again, only one is shown for simplicity.

A presently preferred program for ROM 114 is set forth in table form in FIG. 11, where each of the various "states" are identified and will now be described as follows:

(1) IDLE—In this state, the transmitter is shut down.
(2) MARK—In this state, the STARTBIT output line is raised to "wire-OR" a binary one with the TXDATA signal input to the flip-flop 108 (FIG. 9).
(3) DATA—In this state, data loaded into the shift register 70 from the using device 36 via the output buffer register 66 is forwarded to the phase encoder 56.

Although the invention has been described with respect to a presently preferred embodiment, it will be appreciated by those skilled in the art the various modifications, substitutions, etc. may be made without departing from the spirit and scope of invention as defined in and by the following claims.

What is claimed is:

1. A digital phase decoder for receiving and decoding phase encoded data transmitted as a plurality of bitcells, each of a predetermined time period, with a predetermined number of said bitcells representing a packet comprising means for synchronizing received phase encoded data with the frequency of a predetermined clock signal having a rate exceeding the frequency of said bitcells, means coupled to the output of said synchronizing means for developing a pair of output signals respectively indicative of a transitional change of a binary state of said received data, means coupled to said developing means for generating a decode signal representative of one of several conditions due to a transitional change, said conditions being indicative of either a data transition from a low state to a high state or a data transition from a high state to a low state or an illegal transition treated as a data collision, means for counting the number of clock intervals of said predetermined clock signal under the control of said generating means, said generating means monitoring said counter means to ascertain relative to each bitcell period where a transitional change has occurred in relation therewith, the point of occurrence indicative of one of said several conditions.

2. The phase decoder of claim 1 wherein some of said data transitions are indicative of a setup transition if occurring within a predetermined portion of said bitcell period.

3. The phase decoder of claim 1 wherein the frequency of said bitcells is one eighth of the frequency of said predetermined clock signal.

4. The phase decoder of claim 1 wherein said generating means is coupled to reset said counter means.

5. The phase decoder of claim 1 wherein said generating means will declare an end of packet transmission when the transitional state of said synchronizing means output signals both remain in a designated binary state for a predetermined and comparatively extended period of time.

6. The phase decoder of claim 1, wherein said synchronizing means includes a first flip-flop.

7. The phase decoder of claim 6, wherein said developing means includes second and third flip-flops for respectively developing said pair of output signals, said second and third flip-flops being connected in series with each other and with said first flip-flop.

8. The phase decoder of claim 7, wherein said generating means includes a read-only-memory programmed to ascertain said conditions of said received phase-encoded data when said pair of output signals from said second and third flip-flops are different.

* * * * *